N. J. SAUVAGE.
AUTOMATIC SLACK ADJUSTER.
APPLICATION FILED JAN. 12, 1916.
1,416,980.
Patented May 23, 1922.
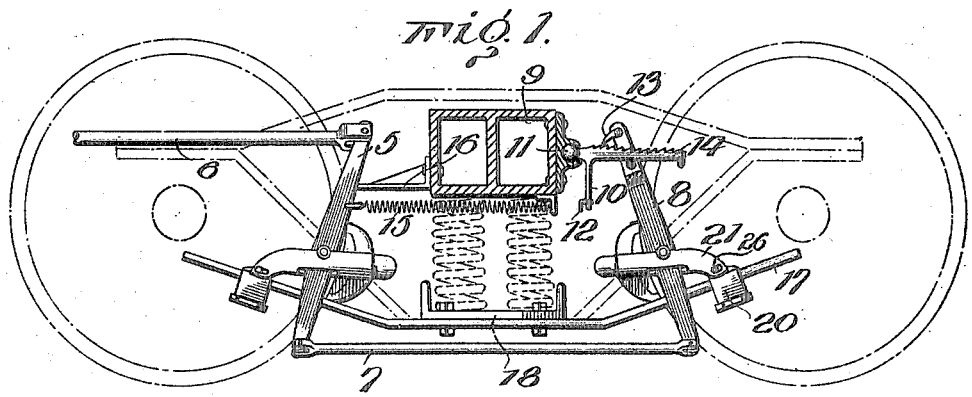
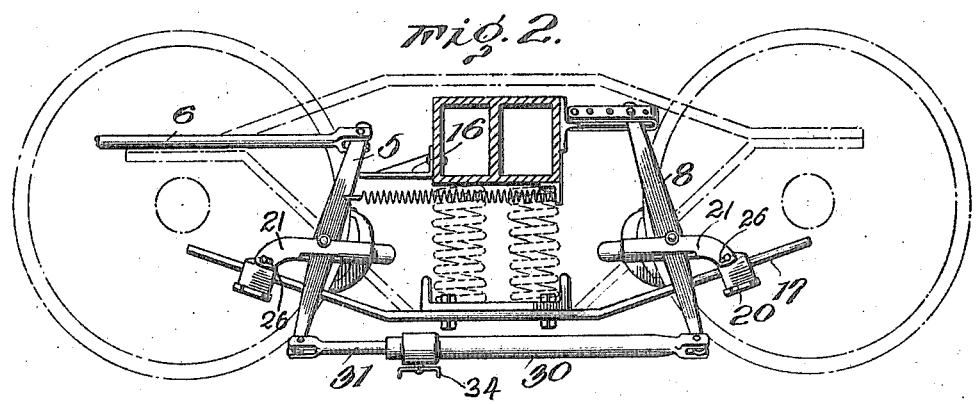
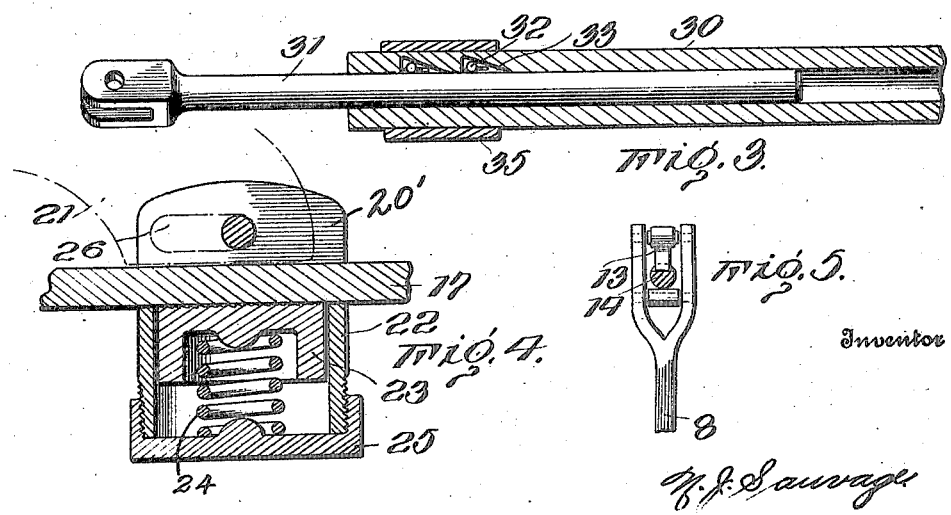

UNITED STATES PATENT OFFICE.

NORMAN J. SAUVAGE, OF FLUSHING, NEW YORK.

AUTOMATIC SLACK ADJUSTER.

1,416,980. Specification of Letters Patent. Patented May 23, 1922.

Application filed January 12, 1916. Serial No. 71,673.

*To all whom it may concern:*

Be it known that I, NORMAN J. SAUVAGE, a citizen of the United States, residing at Flushing, Long Island, in the county of Queens and State of New York, have invented certain new and useful Improvements in Automatic Slack Adjusters, of which the following is a specification.

This invention relates to automatic slack adjusters for the brake rigging of railway cars, and in its more intense aspect to slack adjusters for truck brake rigging.

One of the objects of the present invention is to provide a simple and practical slack adjuster of the above general character having few or no extra parts which will be cheap and practical to manufacture and install. A further object is to provide an automatic slack adjuster which may be readily applied to trucks now in general use with a minimum amount of effort and expense due in part to the use of certain portions of the truck structure in connection with the slack adjuster mechanism. A further object is to provide an efficient and reliable means for taking up and holding the slack in excess of the predetermined lost motion of the brake mechanism provided for brake shoe clearance.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Fig. 1 is a side elevation partly in section showing the truck brake rigging and such parts of the truck as are necessary to fully understand the features of invention;

Fig. 2 is a similar view showing a modification of the invention applied to a truck;

Fig. 3 is a detail sectional view of the push rod and release mechanism of the modification shown in Fig. 2;

Fig. 4 is a sectional view of the friction holding device;

Fig. 5 is a detail sectional view of the permanent take up mechanism shown in Fig. 1.

Referring now to the drawings in detail and more particularly to Fig. 1, 5 denotes a live lever having its upper end pivotally connected to a pull rod 6 adapted to be operated by the brake cylinder or other operating mechanism, not shown. The other end of this live lever 5 is pivotally connected to a push rod 7 the opposite end of which is connected to the lower end of a dead lever 8 adjustably mounted at its upper end on the car bolster. These levers are of usual construction and actuate the brake beams in a well known manner.

This adjustable mounting in the present case constitutes a permanent take up and holding device and comprises an L-shaped lever 10 having a rotatable ball and socket connection 11 with the car bolster. A rod 12 connects a depending arm of this lever 10 with the side of the truck whereby a push or pull will rotate the connection 11 for releasing the pawl and ratchet 13—14 thereby permitting the dead lever to be restored to original position when new shoes are to be applied. The upper end of the dead lever which is preferably of the duplex type, as indicated by the broken away portion, carries a pawl 13 engaging a ratchet 14, thereby to permit the slack due to the wear of the brake shoes or other parts to be taken up and permanently held at this point. A spring 15 connects the upper end of the live lever 5 with the car bolster 9 and is adapted to return these parts of the brake rigging to normal position on release of the braking power with the live lever against a stop 16 as shown.

Certain types of truck now in general use are provided with a relatively fixed part that may be termed in the present case a brake beam fulcrum guide 17 preferably rigidly secured to the underside of a spring plank 18, and extending longitudinally of the car truck. This fulcrum guide 17 supports a sliding shoe 20 turning upwardly extending ears 20′, Fig. 4, pivotally connected at the outer end of a strut 21 carried by the brake beam of the truck, if of that type, for supporting the brake shoe. Thus as the brakes are applied each shoe will be guided laterally and upwardly into proper engagement with the periphery of the wheel. This structure is of standard type and in the present invention, there is secured to this shoe 20 a friction take up clutch or holding device, shown in detail, Fig. 4. This device comprises the housing 22 containing a friction dog 23 normally held in engagement with the under side of the fulcrum guide 17 by means of a spring 24 adjustably secured in place by a threaded cap 25. A similar construction is, of course, provided at the opposite side adjacent the dead lever. Both of the struts 21 are provided with lost motion slots 26 surrounding the pivot pin of a size to permit the desired brake shoe clearance.

This device may be conveniently operated in the following manner:

When the brakes are applied the upper end of the live lever 5 moves toward the left, Fig. 1, and carries the associated brake shoe into contact with the periphery of the adjacent wheel. The lower end of the live lever reacts in the customary manner to cause a corresponding operation of the dead lever brake shoe on the opposite wheel. If any excess travel of the brake shoes takes place due to wear or other causes, exceeding the lost motion provided for by the slots 26, the shoes and friction clamps 23 will travel along the fulcrum guide 17 a corresponding amount. When the brakes are released the live lever will be returned to normal position under the action of the return spring 15 against stop 16 and as retractive movement of the clamp 23 is prevented it will cause the pin through the strut 21 and associated lever to act as a fulcrum about which the lever turns, causing a relative movement of the connecting rod 7 at the bottom towards the left. A similar action takes place with respect to the opposite or dead lever friction clamp, and the upper end of the dead lever will be moved toward the right an amount corresponding to the excess motion or as nearly approximate thereto as permitted by the type of takeup device illustrated in Fig. 1. Of course, if positively acting frictional dogs were employed this take-up would be exact.

In Fig. 2 there is illustrated a modification in which the take-up and holding mechanism is transferred from the support of the dead lever to the connecting or push rod between the lower ends of the live and dead lever and the dead lever is supported by a well known type of adjustable support. The other brake rigging mechanism is substantially the same as that previously described. The connecting or push rod comprises a telescopic tube or casing 30 within which closely fits a push rod 31, and is adapted to be extended when excess travel of the brake rigging takes place as above explained. It is to be noted that the casing 30 is provided with balls or rollers 32 as shown in Fig. 3, coacting with inclined cams 33, or between the effective telescopic ends of parts 30 and 31, thus permitting the rod 31 to be pulled out freely under the action of the adjusting mechanism above described yet positively prevent an inward movement thereof. The take-up feature of the adjusting mechanism consists of shims, ratchets, boxes, screws or other well known mechanisms familiar to those skilled in this art for accomplishing the desired purpose.

When installing new brake shoes the brake rigging must be re-adjusted and it is necessary to release these frictional holding devices while the brake beams are pulled together to original position. This release may be done in any desired manner and as shown in Fig. 4 a loosening of the cap 25 will permit the shoe 23 to drop away from the rod 17 and be moved freely back the desired amount. The dead lever support in Fig. 1 is rotated to permit the return of the upper end of the lever to its original position. With the device shown in Fig. 2 a transverse operating shaft 34 is preferably provided adjacent the spring plank which is actuated from either side of the truck to shift a sleeve 35 longitudinally and move the rollers 32 out of engagement with the rod 31 as shown in Fig. 3, thus permitting the parts 30 and 31 to be telescoped.

It is thus seen that the present invention provides a simple and practical mechanism adapted to accomplish, among others, all the objects and advantages above set forth, and is particularly advantageous on the type of trucks illustrated inasmuch as a saving in cost of installation is obtained by the omission of a specially constructed adjusting rod. It is believed that without material modification the invention may be applied to all types of truck or foundation brake rigging in which the adjusting mechanism will coact in a similar manner with some part of the truck or car structure.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspect of this invention, and therefore such adaptations should and are intended to be comprehended within the meaning and range of equivalency of the following claims.

I claim:

1. In an automatic slack adjuster, the combination with a relatively fixed part of a standard truck structure adapted to act as a brake beam guide, of a live lever, a dead lever, permanent take-up and holding mechanism connected to said levers, and temporary take-up and holding mechanism connected to said levers and acting upon the above mentioned brake beam guide.

2. In an automatic slack adjuster, in combination, a live lever, a dead lever, a relatively fixed part of the truck structure, an adjusting device having a frictional engagement with said part and a permanent take up and holding device adapted to be actuated by said frictional device on excess travel of the brake rigging.

3. In an automatic slack adjuster, in combination, a live lever, a dead lever, a push rod connecting said parts, a permanent take up and holding device associated with one of said parts, a relatively fixed portion of the truck structure and an adjusting device associated with the live lever and having a frictional engagement with said relatively fixed part.

4. In an automatic slack adjuster, in combination, a live lever, a dead lever, a push rod connecting said parts, a permanent take up and holding device associated with one of said parts, a relatively fixed portion of the truck structure, and a temporary adjusting device having a frictional engagement with said relatively fixed part and coacting with the dead lever adapted to actuate the permanent holding device on excess travel of the brake rigging.

5. In an automatic slack adjuster, in combination, a relatively fixed part of the truck structure, a live lever, a dead lever, a push rod connecting the ends of said levers, a permanent take up and holding device associated with one of said levers and temporary holding and adjusting devices associated with each of said live and dead levers.

6. In an automatic slack adjuster, in combination, a member secured to the truck frame adapted to guide the brake shoes in their movement, a live and dead lever, a rod connecting the lower ends of said levers, a permanent holding device associated with one of said levers and temporary frictional holding devices associated with said levers and coacting with the relatively fixed part of said truck frame.

7. In an automatic slack adjuster, in combination, a relatively fixed part secured to the spring plank of the truck, live and dead levers, a push rod connecting the lower ends of said levers, a permanent take up and holding device associated with one of said parts, a friction shoe coacting with the part secured to the spring plank, and a strut carried by one of the levers having a lost motion connection with said shoe.

8. In an automatic slack adjuster, in combination, a relatively fixed part secured to the spring plank of the truck, live and dead levers, a push rod connecting the lower ends of said levers, a permanent take up and holding device associated with one of said parts, friction shoes coacting with the part secured to the spring plank, and a strut connected with each of said levers having lost motion connections with said shoes.

9. In an automatic slack adjuster, in combination, a member disposed longitudinally of the truck, and secured to the spring plank, live and dead levers at each side of the bolster connected at their lower ends beneath the spring plank, struts carried by both of said levers, and means having a lost motion connection with the struts adapted to have a frictional engagement with the member carried by the spring plank, said means being provided with means for adjusting the degree of friction.

10. In an automatic slack adjuster, in combination, a truck having a bolster and spring plank, a dead lever supported from the bolster, a live lever positioned at the opposite side of the bolster and adapted to normally rest against a stop carried thereby, a return spring for restoring the parts to normal position on release of the brakes, a push rod connecting the lower ends of said live and dead levers, a member connected with the spring plank, and a member connected with the levers having frictional engagement with said member.

11. In an automatic slack adjuster, in combination, a truck having a bolster and spring plank, a dead lever supported from the bolster, a live lever positioned at the opposite side of the bolster and adapted to normally rest against a stop carried thereby, a return spring for restoring the parts to normal position on release of the brakes, a push rod connecting the lower ends of said live and dead levers, a member carried by the spring plank, means carried by the levers having frictional engagement with said member, and means for rotating the support of the dead lever to permit the dead lever to be returned to normal position.

12. In an automatic slack adjuster, in combination, a car bolster and spring plank, a member secured to said spring plank and disposed longitudinally of the truck, live and dead levers at opposite sides of the bolster, means for returning the levers to normal position, a push rod connecting the lower ends of the levers and frictional take-up devices associated with each lever and coacting with the member secured to the spring plank.

In testimony whereof I affix my signature in the presence of two witnesses.

NORMAN J. SAUVAGE.

Witnesses:
E. F. NIMMO,
Mrs. H. A. SAUVAGE.